UNITED STATES PATENT OFFICE.

PAUL TRAULSEN AND FRIEDRICH BUNDESEN, OF BERGEDORF, NEAR HAMBURG, GERMANY.

FILTER.

No. 882,030.   Specification of Letters Patent.   Patented March 17, 1908.

Application filed March 12, 1907. Serial No. 362,004.

*To all whom it may concern:*

Be it known that we, PAUL TRAULSEN, a citizen of Hamburg, and resident of No. 27 Kamp Chaussee, Bergedorf, near Hamburg, in the Empire of Germany, manager, and FRIEDRICH BUNDESEN, a citizen of Hamburg, and resident of No. 18 Kamp Chaussee, Bergedorf, near Hamburg, in the Empire of Germany, foreman, have invented a new and useful Improved Filter, of which the following is a specification.

The present invention relates to an improved filter, which is adapted to be advantageously employed for a variety of purposes. The essential feature of the invention consists in the combination, with a filter of any suitable and known construction, of a floating body for carrying said filter at the surface of the matter to be filtered, the filtered liquid being carried off by a rigid or flexible or telescoping tubular conduit.

Wtih these ends in view the invention consists in the novel combination, arrangement and adaptation of parts, all as more fully hereinafter explained, shown in the accompanying drawings and then specifically set out in the appended claims.

Figure 1:
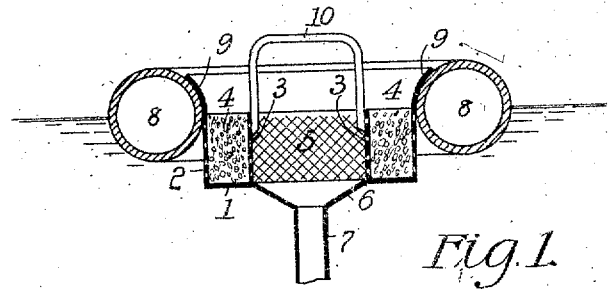
Figure 2:
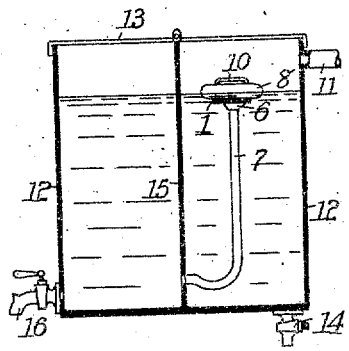
Figure 3:
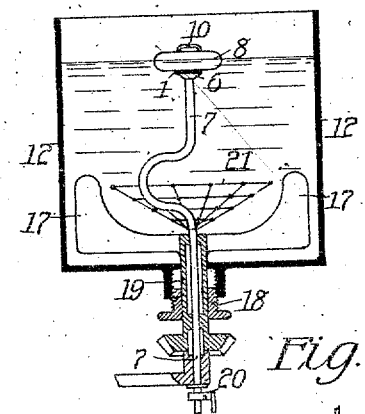
Figure 4:
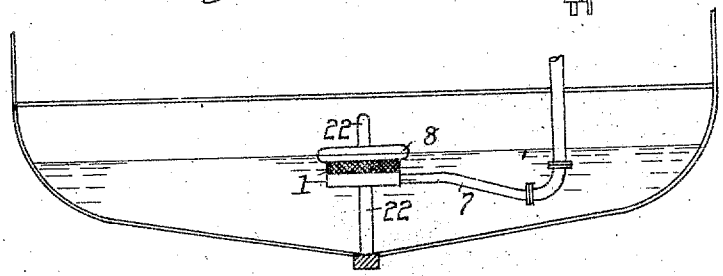

Figure 1 shows, as an example, one mode of carrying into practice our improved filter. Figs. 2, 3 and 4 indicate different examples of employment of our improved filter.

The improved filter according to our present invention is primarily destined to separate from liquids of various kinds the foreign matter suspended therein; it may, however, also be employed to advantage for chemically changing the liquid in its filtration. With respect to the latter purpose, we refer for instance to the employment of animal and vegetable charcoals known to be suitable for the absorption of gases, tastes and odors from liquids filtered therethrough. The filtering material may be chosen in every case in conformity with the purpose for which it is required, the invention not being intended to be restricted to any special material.

We will now proceed to describe our invention more fully.

In the filter construction, shown by way of example in Fig. 1, the numeral 1 denotes a receptacle of any suitable material, preferably of metal, which is protected in a known way against corrosion. The peripheral wall 2 of said receptacle 1 is perforated or constituted by a sieve, the size of whose meshes depends on the work which the filter is to perform.

3 denotes a perforated cylindrical shell, which is inserted concentrically in the receptacle 1, thereby producing an annular space 4 for the reception of the filtering material.

The liquid to be filtered penetrates through the holes or meshes of the peripheral wall 2 into the receptacle 1, it thereupon passes through the filtering material contained in the annular space 4 and issues through the perforations in the internal cylindrical shell 3 in a filtered or clarified or chemically altered state. In percolating through the perforated shell 3 it enters the center space 5 of the receptacle 1, which is cut off from any direct communication with the liquid to be filtered.

6 denotes a funnel-shaped spout at the center portion of the receptacle 1, which is margined by the perforated shell 3.

7 denotes a rigid or flexible or telescoping tubular conduit, tightly connected with the aforesaid funnel shaped spout 6, which leads the filtered matter from the center space 5 to its place of destination.

The filter hereinbefore described is carried by a floating body 8, which in the construction illustrated in Fig. 1 consists of a buoy 8, filled with air under atmospheric or higher pressure or inflated with compressed gases. The connection between the filter and the buoy can be effected in any suitable known manner. In the example illustrated in Fig. 1 the upper edge 9 of the peripheral wall 2 of the receptacle 1 is rounded outwardly to such an extent, that the buoy, whose internal diameter corresponds exactly or approximately with the external diameter of the body of the receptacle 1, rests against the curved edge 9 as shown, thereby supporting the filter at the surface of the liquid to be treated.

A handle 10, attached to the filter in any convenient way facilitates the manipulations, when it is desired or required to remove, exchange or replace the filtering material or when the filter having completed its work, is to be taken out and stored for further use.

In Fig. 2 is shown the employment of the floating filter described for purifying water for household or industrial purposes. The water is supplied by the pipe 11 to the reservoir 12, which is adapted to be closed at its top end by a lid 13 in order to keep off as far as possible foreign and injurious matter suspended in the atmosphere. By the insertion of a partition 15 said receptacle 12 is divided into two chambers, each of which is provided with a draw off cock. The draw off cock of the chamber directly communicating with the supply pipe 11 is denoted by the numeral 14; the draw off cock of the second chamber is denoted by the numeral 16. The latter cock serves for issuing the filtered water, while the cock 14 enables the removal from the reservoir 12 of the sediments separated from the water in the filtering operation and collecting at the bottom.

The floating filter previously described is inserted in the chamber of the reservoir 12 adjacent to the supply pipe 11. The flexible tubular conduit 7 leading from the center compartment of the filter carries the filtered water into the second chamber of the reservoir 12. To that end said flexible conduit 7 has its lower extremity tightly attached in a suitable hole near the bottom of the partition 15.

When the improved floating filter is to be used for clarifying purposes, for instance in the clarification of fruit juices and the like, we may arrange inside the reservoir 12, which serves for the reception of the matter to be treated, a stirring or agitating device. In the example illustrated in Fig. 3 this device consists of the blades 17 attached to a hollow shaft 19, which enters through the stuffing box 18 and is driven by external means from any suitable source of power at the required speed of rotation. The flexible conduit 7 of the floating filter extends through the hollow shaft 19 in order to convey the filtered matter to the outside of the reservoir 12. A stop cock 20 is inserted in the conduit 7 at the end projecting from the hollow shaft 19.

In order to protect the flexible tube 7 from injury and destruction by the rotating blades 17 of the stirring or agitating device, we arrange in the space between said blades a basket-like grating 21 suitably made of non-corrodible wire. Said grating 21 is fastened to the hollow shaft 19 around the flexible tube 7. When the surface of the matter to be filtered falls and in consequence thereof the floating filter descends, the flexible tube 7 collects in the receiver 21 and is thereby kept away from the rotating blades 17.

In Fig. 4 is shown another mode of employment of our improved floating filter, of considerable importance. It serves for filtering the bilge water before it passes the bilge pump and effectively prevents clogging of the valves and other internal organs of the pump and the pipe conduit. The floating filter is preferably rectilinearly guided up and down in order to free the flexible conduit 7, which carries off the filtered bilge water, from any strain that may otherwise be caused by the movements of the ship. In the construction indicated in Fig. 4 a vertical rod 22 attached to the ship at a suitable place serves for guiding the floating filter, said rod passing through an eye hole provided in the filter or in a lateral projection thereof.

We do not desire to be understood as limiting ourselves to the detail construction and arrangement of parts as herein shown and described, as it is manifest that variations and modifications therein may be resorted to, in the adaptation of our invention to varying conditions of use, without departing from the spirit and scope of our invention and improvements. We therefore reserve the right to all such variation and modification as properly falls within the scope of our invention and the terms of the following claim.

What we do claim as our invention, and desire to secure by Letters Patent, is:

1. An improved floating filter comprising a non-corrodible receptacle 1 provided with a perforated peripheral wall 2 and subdivided by a perforated cylindrical shell 3 into two concentric chambers 4, 5 of which the external chamber 4 serves for the reception of the filtering material; a funnel-shaped spout 6 at the open center portion of the receptacle 1 which is margined by the perforated shell 3; a tubular conduit 7 tightly connected with the aforesaid funnel-shaped spout 6 for leading off the filtered matter from the center chamber 5 of the receptacle 1 to its place of destination; and a floating body 8 in the shape of a buoy filled with air under atmospheric or higher pressure or inflated with compressed gases, said floating body being detachably connected to the receptacle 1 by curving outwardly the top edge 9 of the peripheral wall 2 so as to form an abutment face for the buoy; substantially as described and shown and for the purposes set forth.

2. A floating filter of the character described, having a basket-like grating 21 for the reception and protection of the flexible conduit 7, said grating 21 coming into action when the floating filter descends by virtue of the surface of the matter to be filtered falling, substantially as described and shown and for the purpose set forth.

In witness whereof we have hereunto signed our names these 8th & 9th days of February, 1907, in the presence of two subscribing witnesses.

PAUL TRAULSEN.
FRIEDRICH BUNDESEN.

Witnesses:
ERNEST H. L. MUMMENHOFF,
IDA CHRIST. HAFERMANN.